May 22, 1956     A. T. TOMÁS     2,746,399
ARTICULATED RAILWAY TRAINS
Filed June 26, 1951     6 Sheets-Sheet 1
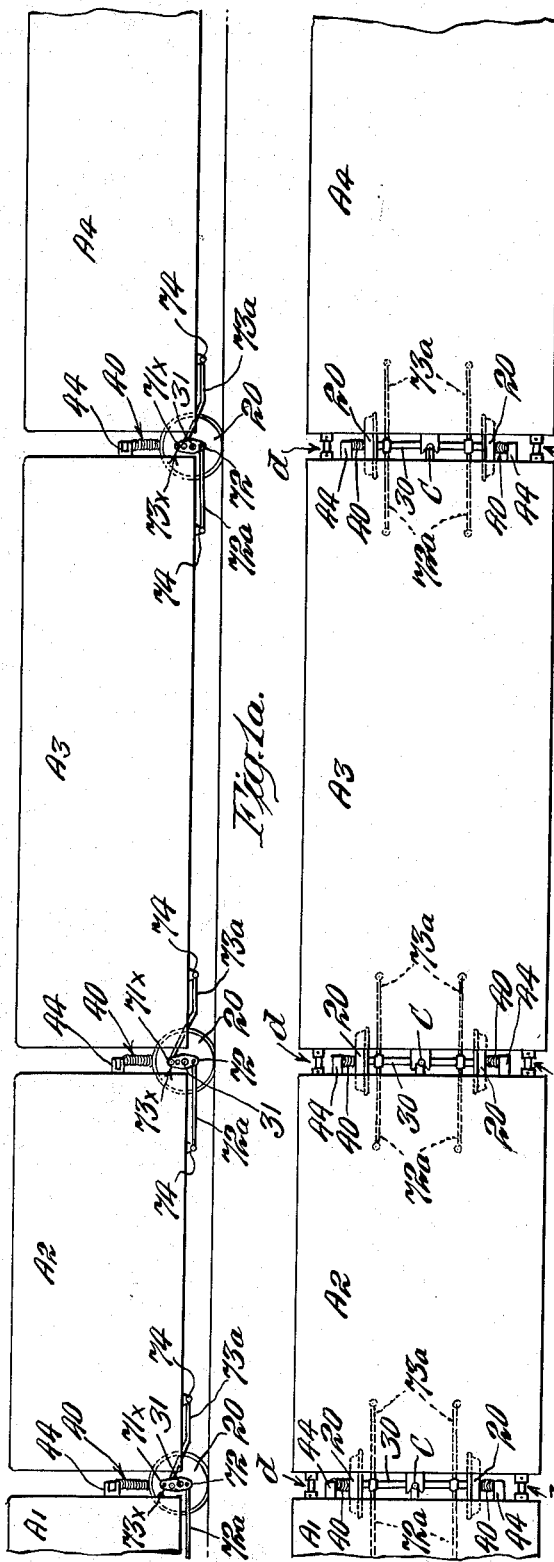
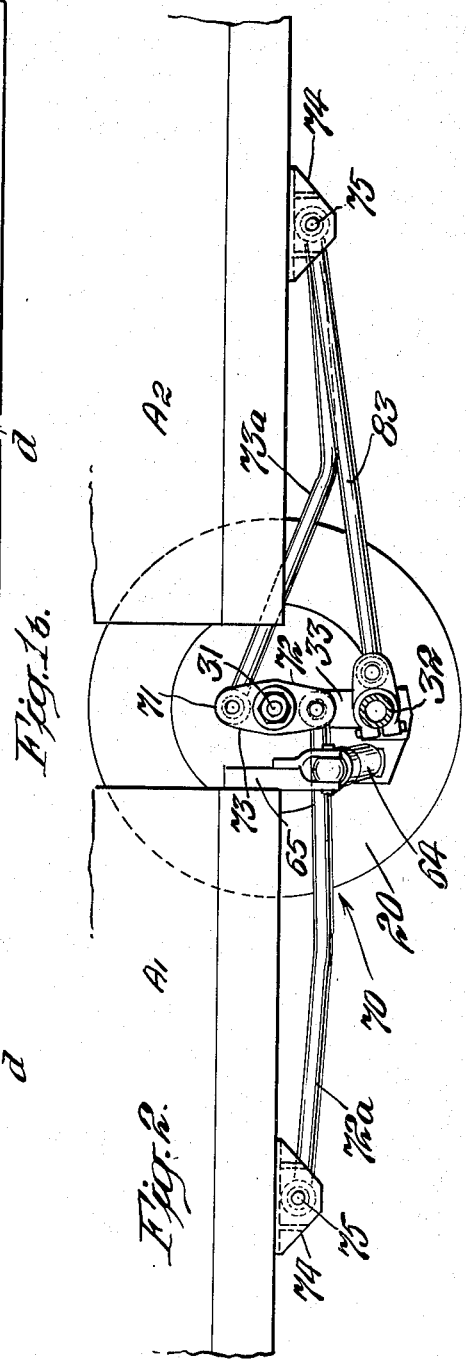
INVENTOR.
Angel Torán Tomás
BY
Byerly, Townsend, Watson
ATTORNEYS

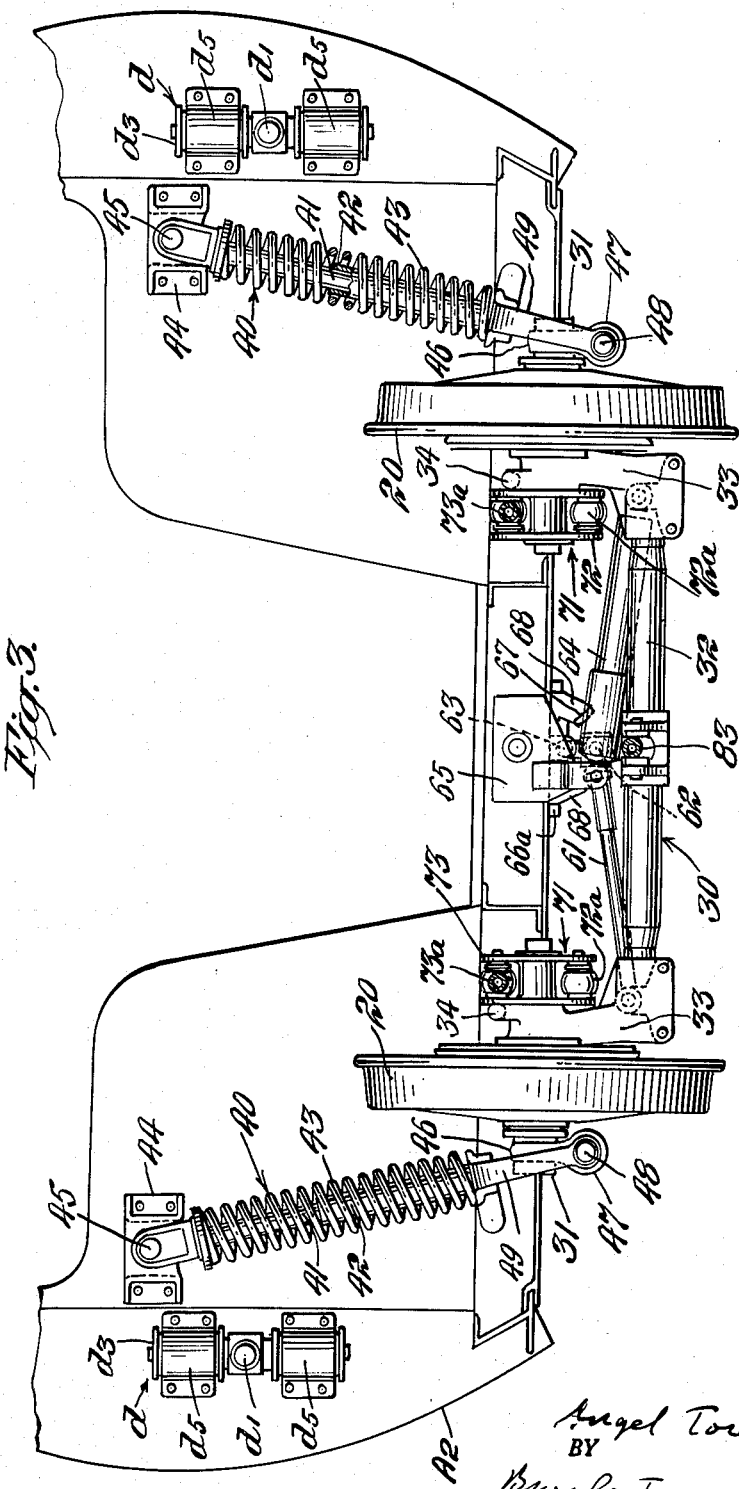

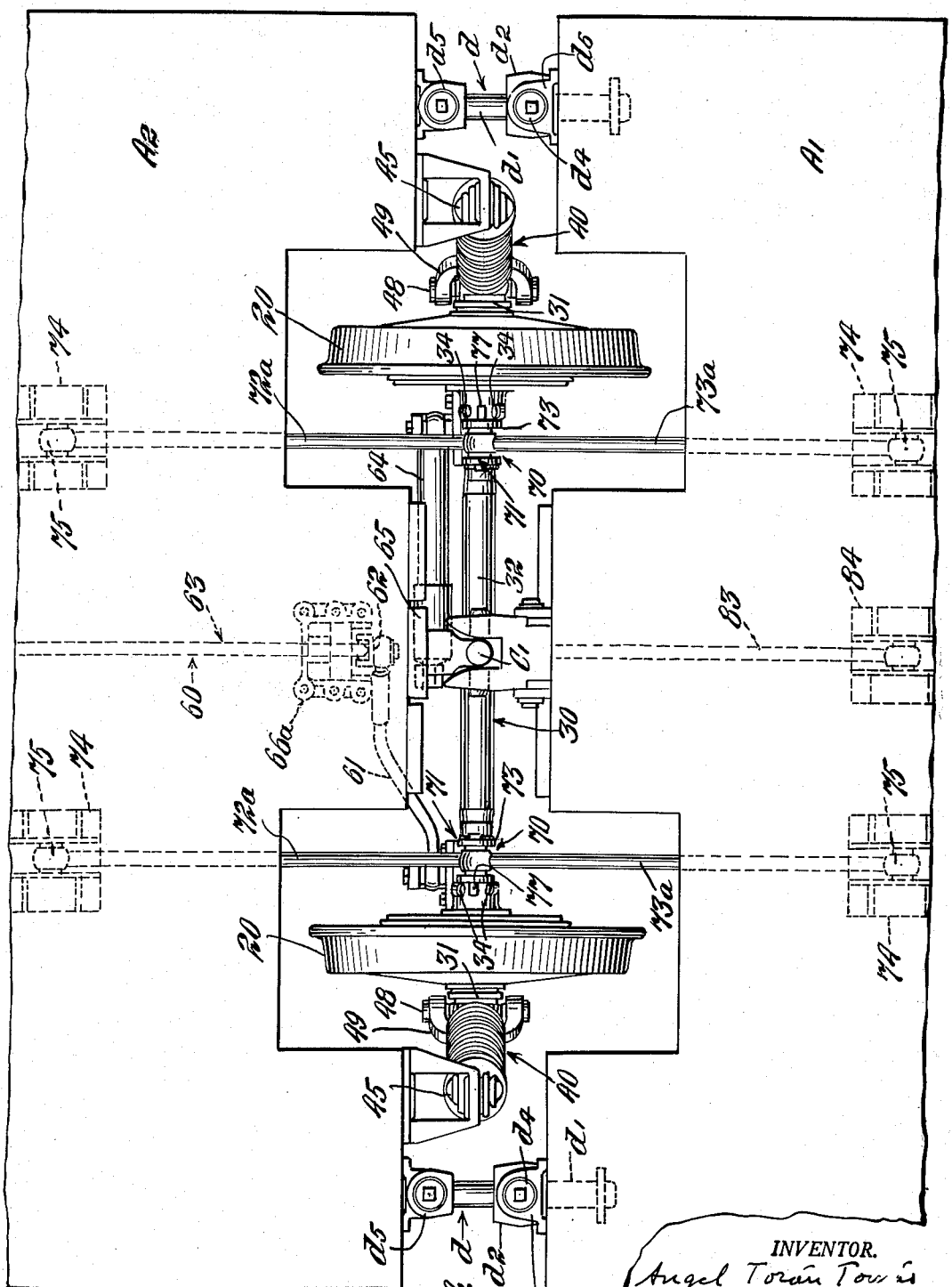

May 22, 1956  A. T. TOMÁS  2,746,399
ARTICULATED RAILWAY TRAINS
Filed June 26, 1951  6 Sheets-Sheet 4

INVENTOR.
Angel Torán Tomás
BY
Byerly, Townsend & Watson
ATTORNEYS

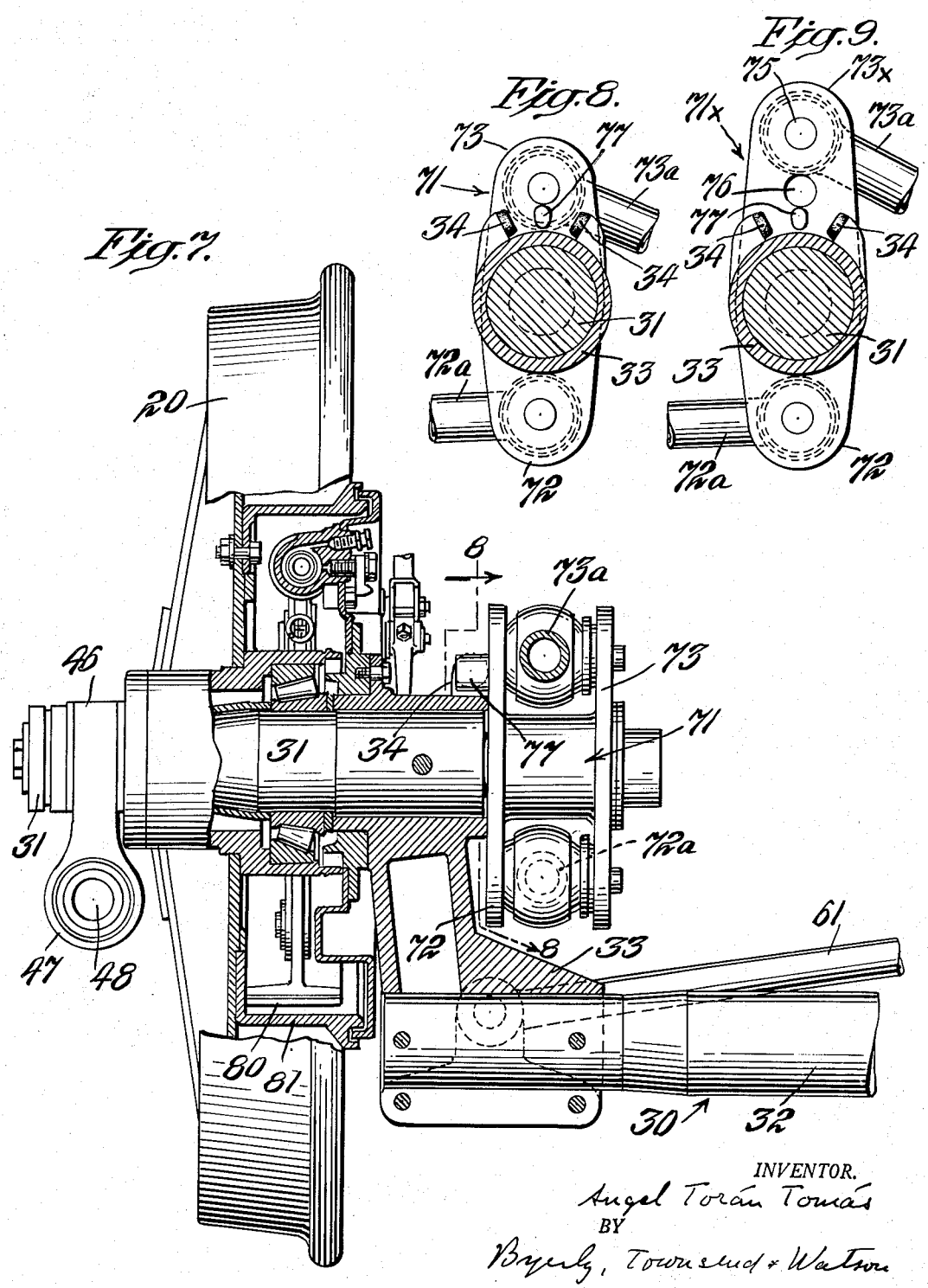

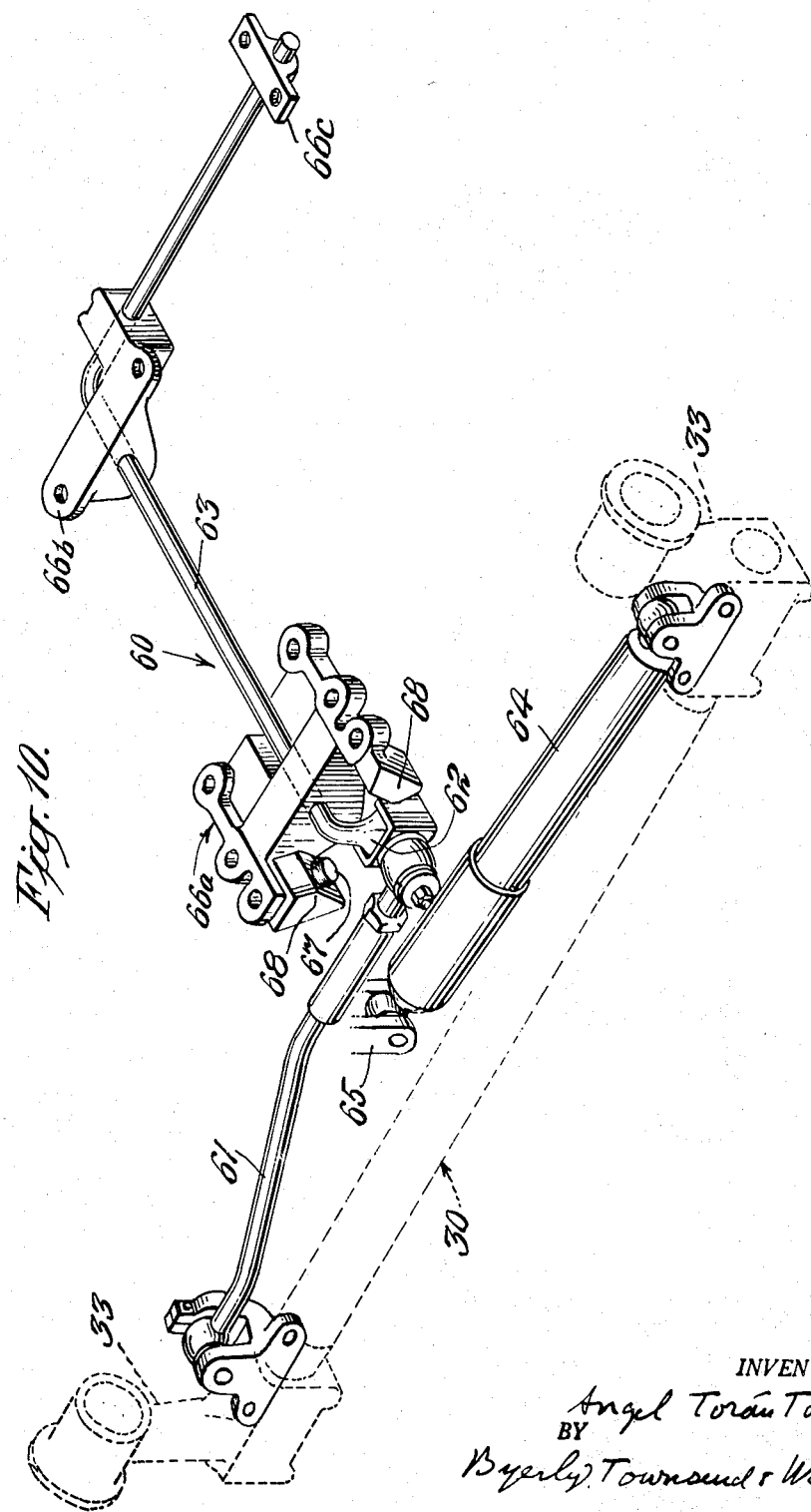

United States Patent Office 2,746,399
Patented May 22, 1956

2,746,399

ARTICULATED RAILWAY TRAINS

Angel Torán Tomás, Madrid, Spain, assignor to Patentes Talgo, S. A., Madrid, Spain, a corporation of Spain Application June 26, 1951, Serial No. 233,515

10 Claims. (Cl. 105—4)

This invention relates to articulated railway trains of the general type shown in Omar Patent No. 2,462,666 in which a series of articulated car bodies are supported upon pairs of wheels located at or near the articulation points. The object of the invention is to provide connections between the pairs of wheels and the articulated ends of the car bodies which provide for minimum tractive effort and for easy riding, especially on curves.

In accordance with the invention, the axle of each pair of wheels is connected to the articulated ends of the pair of vehicle bodies by a spring suspension and a guiding means. The spring suspension supports the adjacent ends of the vehicle bodies on the wheel axle and at the same time permits fore and aft movement of the axle with respect to the vehicle body to which it is connected. The guiding means, which are connected to the wheel axle and to both the car bodies, serves to prevent any longitudinal movement of the middle point of the axle with respect to the car bodies and at the same time causes movements of the ends of the axle which keep it perpendicular to the track on which the vehicle is running, both when the track is straight and when it is curved.

In the form which I consider most desirable, the spring suspension consists of a pair of long, nearly vertical spring struts extending between two points at the end of one of the vehicle bodies and the ends of the wheel axle. The struts normally lie in a common vertical plane which is in or near the vertical plane which includes the pivot by which the car bodies are articulated. The spring struts have universal joints at their ends so that they leave the axle free to move laterally or lengthwise of the car body. The guiding means includes a linkage which connects the outer portions of the wheel axle with both of the car bodies and is so arranged that the middle point of the axle is held in the vertical plane of the upper ends of the spring struts, while the ends of the axle are moved forward or backward in accordance with the angle between the articulated car bodies so as to keep the axle perpendicular to the tracks. While various linkages may be used, a special feature of my invention consists in the use of symmetrical pairs of bars connecting the two car bodies with levers rotatably mounted on the axle.

In order that my invention may be clearly understood, I will describe in detail the specific articulated train embodying it which is shown in the accompanying drawings, in which:

Figs. 1a and 1b are diagrammatic side and plan views of a portion of an articulated train embodying the invention and consisting of two short cars A–1, A–2 and two long cars A–3, A–4;

Fig. 2 is a partial side elevation of the connection between two car bodies, sectioned on the axis of the train;

Fig. 3 is an end elevation of one of the car bodies showing the wheel axle and connections between this axle and the car body;

Fig. 4 is a plan view of a wheel axle and its connection to two of the car bodies, the adjacent ends of which are shown diagrammatically;

Fig. 7 is an elevation of a wheel and one end of the axle partly sectioned on the axis of the wheel;

Fig. 8 is a section on the line 8—8 of Fig. 7 showing a lever forming part of the guiding linkage;

Fig. 9 is a similar view showing a modified lever; and

Fig. 10 is a perspective view of the spring device and shock absorber for centering the wheels, including a phantom view of the axle.

Figure 5:
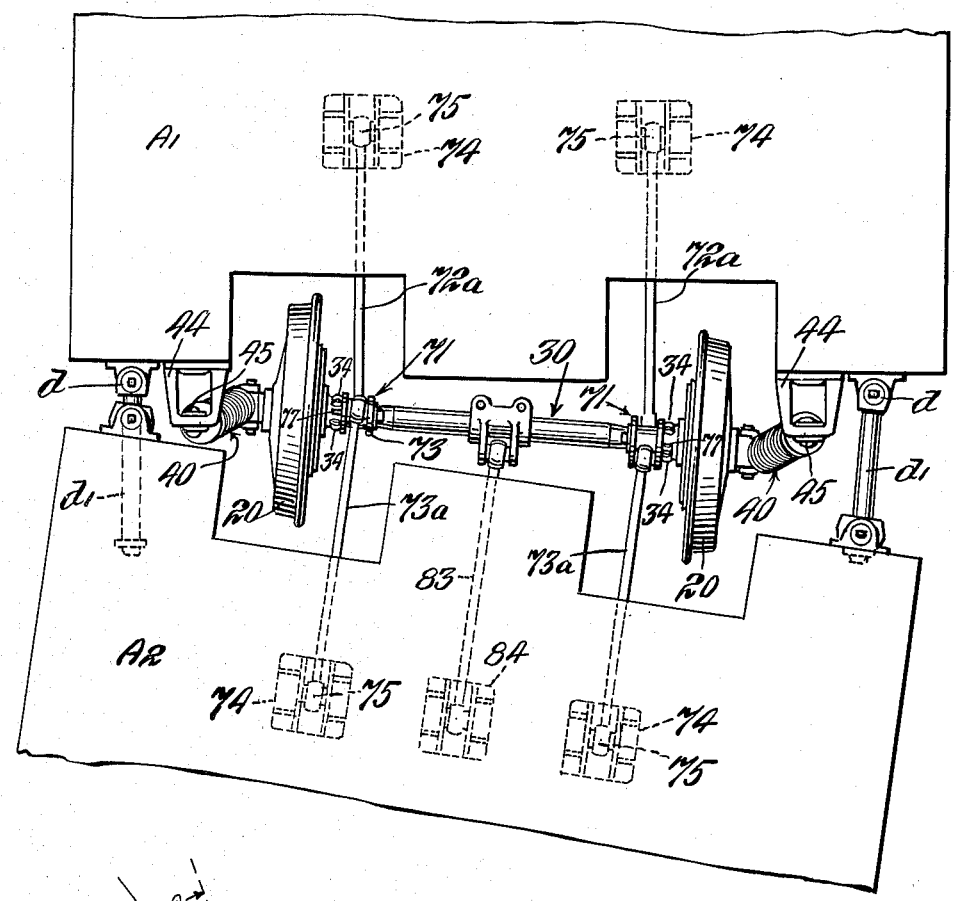
Fig. 5 is a plan view similar to Fig. 4 with parts omitted, indicating the position of two car bodies and the connecting parts where the train is on a curved track.

The articulated train shown in the drawings consists of a number of rigid body sections or car bodies A (specifically identified as A–1, A–2, A–3, etc. where necessary) with traction connections $c$, each including a vertical pivot $c_1$ (Figs. 1a, 1b, 4). The pivots $c_1$ are the articulation points of the vehicle. The body sections A are aligned by weight-bearing, lateral connections $d$ (Figs. 2, 3 and 4). The connections $d$ are essentially sliding connections each consisting of a slide element $d_1$ and a guide element $d_2$ in which the slide fits. The slide element $d_1$ is secured to a vertical pivot $d_3$ mounted in vertical bearings $d_5$ attached to the end of one of the sections A. The guide element $d_2$ is attached to a vertical pivot $d_4$ which is mounted in vertical bearings $d_6$ attached to the end of the other section. A pair of wheels 20 is located between adjacent sections near one of the articulation points $c_1$.

The wheels 20 of each pair of wheels are mounted on stub shafts 31 forming part of a dead axle 30. The dead axle 30 is a rigid structure consisting of two stub shafts 31 and a central bar 32 connected by elbow members 33 which serve to offset the stub shafts from the bar 32 (Figs. 3, 7).

The weight of the ends of two articulated sections is supported on the axle 30 by two long, nearly vertical spring struts 40.

Each spring strut 40 consists of two telescopic tubular members 41, 42 surrounded by a coiled compression spring 43. The upper end of each strut 40 is secured to a bracket 44 mounted on one of the car bodies A at one side of its end and most desirably near or above its center of gravity and close to one of the lateral connections $d$. The upper end of each strut 40 is connected to its bracket 44 by means of a universal joint 45 of the spherical bearing type. The lower end of each strut 40 is connected to one of the outer ends by the dead axle 30 by means of a universal joint including horizontal and vertical pivots. The horizontal pivot is the end of the stub shaft 31 on which a sleeve 46 is journalled. An extension of this sleeve carries the bearing 47 for a horizontal pivot pin 48 mounted in a fork 49 at the lower end of the strut.

Because of the universal joints at their ends, the spring struts 40 leave the axle 30 free to move either laterally or longitudinally. The length of the spring struts is such that small horizontal movements of the axle with respect to the body do not cause appreciable changes in the height of the body above the axle.

Lateral movements of the axle away from its central position in relation to the car structure are restrained and controlled by a spring device 60 and the telescopic shock absorber 64. Spring device 60 includes a rod 61 connected at one end to one of the elbows 33 of the axle structure and pivoted at the other end to arm 62, the free turnable end of torsion spring bar 63 mounted under the bottom of car body A–2 by brackets 66a, 66b, 66c. Rotation of spring bar 63 is limited at its free end 62 and, therefore, the extent of lateral movement of the axle connected to 62 through rod 61 is positively limited and lateral stability is guaranteed by means of rubber bumpers 67 on arms 68 depending from the bracket 66a which limit the displacement of the arm 62. The outer end of telescopic shock absorber 64 is connected to the other elbow 33 of axle structure and the inner member of said shock absorber is pivoted to a bracket 65 mounted on the bottom of car body A-2 (see Figs. 3, 4 and 10).

The fore and aft movement of the axle 30 which is permitted by the spring struts 40 is limited and controlled by a linkage 70 connecting the axle with both the car bodies between which it is located. This linkage (1) restrains the middle point of the axle against all longitudinal movement with respect to the car bodies so that it always remains in the vertical plane defined by the upper ends of the spring struts 40, and (2) causes such fore and aft movements of the ends of the axle as are needed to maintain the axle always perpendicular to the track (straight or curved) on which the train is running.

Figure 6:
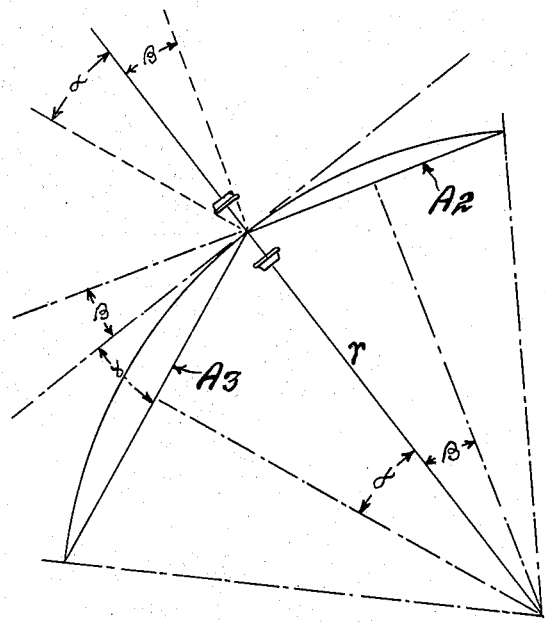
Fig. 6 is a diagram showing a part of the train on a curved track and greatly exaggerating the curvature of the track for the sake of clarity.

Fig. 6 shows diagrammatically the position of two adjacent cars A-2, A-3 of different lengths when the train is on a curved track. In order to maintain the pair of wheels between these cars parallel to the track, the axis of the wheels must be perpendicular to a tangent to the track so that this axis lies at an angle $\alpha$ to a perpendicular to the axis of the longer car A-3 and at a smaller angle $\beta$ to a perpendicular to the axis of the shorter car A-2. It is evident from the diagram, Fig. 6, that the ratio between the sines of the angles $\alpha$ and $\beta$ is the same as the ratio between the lengths of the two cars. Since, in practice, the angles $\alpha$ and $\beta$ will be very small, the ratio between their sines will, as a practical matter, be equal to the ratio between the angles. Thus, the wheels may be kept parallel to the track by positioning their axis so that it lies at angles to perpendiculars to the axes of the two cars which bear the same ratio to each other as the ratio between the lengths of the two cars. This positioning is automatically achieved by the guiding linkage.

In the form illustrated in the drawings, the linkage 70 includes two laterally spaced levers of the first class 71 fulcrumed on the axle 30 on the axis of the wheels 20. The two levers are journalled on the inner ends of the stub shafts 31 which project inwardly beyond the elbow members 33. One arm 72 of each lever is connected to one of the car bodies A by bars 72a, while the other arm 73 of each lever is connected to the other car body by bars 73a. The two pairs of bars are normally parallel to the longitudinal axis of the car bodies. They may be bent in vertical planes as shown to avoid interference with fixed parts of the car bodies. They are pivoted to the levers 71 and to brackets 74 secured to the bottoms of the car bodies. While the pivots 75 at the ends of the bars are designed principally to permit turning in a vertical plane, each pivot has a spherical surface permitting freedom of movement in the horizontal plane so that the bars do not prevent slight lateral displacement on the axle.

The bars 72a, 73a are several times the length of the arms 72, 73 of the levers 71 so that neither lateral nor vertical movements of the car bodies permitted by the spring struts appreciably affect the position of the levers. The ratio of the lengths of the two arms 72, 73 of each lever 71 is equal to the ratio between the lengths of the two car bodies to which they are connected. Thus, when the linkage is between two car bodies A-1, A-2 of equal length, the two arms 72, 73 of each lever 71 are of equal lengths, as shown in Figs. 2, 7 and 8; and, when the linkage is between a car body A-3 which has a length 1½ times the length of the car body A-2 as shown in Fig. 1a, the length of the arm 73x of each lever 71x which is connected to the longer car body A-3 is 1½ times the length of the arm 72 of this lever which is connected to the shorter car body A-2, as shown in Figs. 1a and 9. In applying this criterion, the length of each car body is measured between the wheel axles at its two ends.

The operation of the linkage when the train is on a curved track is apparent from a plan view diagram of Fig. 5 which may be compared with the diagram of Fig. 2 which is a sectional side view. It is apparent from Fig. 5 that at the outer side of the curve where the corners of the sections A-1, A-2 are drawn apart, the bars 72a and 73a rotate the lever 71 in a clockwise direction (when the lever is viewed as shown in Fig. 2). At the same time, the bars 72a, 73a at the inner side of the curve rotate the lever 71 on that side in an anti-clockwise direction. As the two levers 71 have the same dimensions and are symmetrically placed, the clockwise rotation of one lever and the anti-clockwise rotation of the other are equal. This results in moving the outer or right-hand end of the axle 30 away from the car body A-1 and moving the left-hand end of the axle toward the car body A-1 by the same amount. As the movements of the two ends of the axle are equal, the middle point of the axle remains in the vertical plane defined by the universal joints at the upper ends of the springs 40. This result is important, since it follows from it that in the steering of the axle the two spring struts 40 are inclined to the vertical plane of their upper ends in opposite directions, so that the inclination of each may be made very small and insufficient to cause any perceptible downward movement of the car bodies which it supports.

In constructing articulated trains, it is convenient to use cars of two different lengths. To facilitate the coupling of such cars without changing the levers 71, a feature of the invention consists in providing a lever 71x with an arm 73x containing two different bores 75, 76 for the attachment of the pivots for the bars, as shown in Fig. 9, so that the cars of two different lengths may be coupled in any desired way in the train by merely inserting the pivots for the bars connected to the longer cars in the outer bores of the lever arms while placing the pivots to be connected to the shorter cars in the inner bores of the lever arms (see Fig. 1).

As a safety measure to prevent derailment in case of the breaking of one of the bars of the linkage and also to facilitate movement of the cars when uncoupled, means are provided for limiting the horizontal turning of the axle 30. These means consist in a stop mechanism for limiting the turning of the levers 71 about the axes of the stub shafts 31. As shown in Figs. 8 and 9, each lever is provided with a lateral projection 77 located between two rubber bumpers 34 mounted on the elbow 33 of the axle. The distance between the bumpers 34 is such that if either one of the bars connected to the lever is intact, the axle cannot turn away from a position perpendicular to the axis of the car body to which this bar is attached by an angle greater than that required to make the axle perpendicular to the tracks on the sharpest curves encountered in the normal running of the train. It is sufficient to leave the axles free to turn a fraction of a degree out of perpendicular position in either direction. This means that the turning of each lever 71 or 71x may be limited by the bumpers 34 to a range of a few degrees.

Brakes, most desirably of the hydraulic type, are provided for the wheels 20. They include brake shoes 80 mounted on the stub shafts 31 of the dead axle 30 and hydraulically actuated to engage the inner surface of brake drums 81 carried by the wheels 20. When the brakes are applied, the reaction tends to rotate the whole dead axle structure about the wheel axis. Such rotation is prevented by a bar 83 extending between the middle point of the central bar 32 of the axle and a bracket 84 secured to the bottom of one of the sections A. Because of its central position and the fact that the pivots at its end permit universal turning, this bar does not interfere with the operation of the bars 72a, 73a in steering the axle nor with the lateral movement of the axle permitted by the horizontal mechanism 60.

In the above specification and the claims which follow, the axis of the train or of the sections of which it is made up is taken as the line of reference. "Longitudinal" or "fore and aft" movements mean movements along or generally parallel to this axis, while "lateral" movements mean movements across or perpendicular to this axis. Also, "symmetrical" means symmetrical with respect to this axis.

What I claim is:

1. In a railway vehicle, the combination with an articulated body consisting of rigid sections connected by vertical pivots, of a wheel axle, means for supporting the adjacent ends of two sections on the axle, and means independent of the supporting means for steering the axle comprising a lever of the first class fulcrumed on the axle at one side of its middle point, and bars connecting the two arms of the lever to eccentric points of the two sections.

2. In a railway vehicle, the combination with an articulated body consisting of rigid sections joined by pivots, of an axle, means for supporting the adjacent ends of two sections on the axle, and means for steering the axle comprising a pair of levers of the first class fulcrumed on the axis of the axle at symmetrically spaced points, a pair of longitudinal bars independent of the supporting means connecting one arm of each lever to symmetrically spaced points of one of the sections, a second pair of bars independent of the supporting means connecting the other arms of the levers to symmetrically spaced points of the other section, universal joints at each end of each bar, the ratio between the lengths of the arms of each lever being equal to the ratio of the lengths of the sections to which they are connected.

3. In a railway vehicle, an articulated body consisting of rigid sections of different lengths, axles supporting the adjacent ends of the sections, and means for steering the axles located between sections of different lengths comprising a lever of the first class fulcrumed on the axle at one side of its middle point and having arms of different lengths, a bar connecting the shorter arm of the lever to an eccentric point of the shorter section and a bar connecting the longer arm of the lever to a correspondingly positioned point of the longer section.

4. In a railway vehicle, the combination with an articulated body consisting of rigid sections connected by vertical pivots, of a running gear including a pair of wheels and an axle, means for supporting the adjacent ends of the two sections on the running gear, and means for steering the axle comprising a pair of levers of the first class fulcrumed on the running gear on the axis of the wheels and located on opposite sides of the middle point of the axle, a pair of longitudinal bars independent of the supporting means connecting one arm of each lever to symmetrically spaced points of one of the sections, and the second pair of bars independent of the supporting means connecting the other arms of the levers to symmetrically spaced points of the other section.

5. The combination claimed in claim 4 in which the lengths of the bars are several times the lengths of the arms of the levers and in which the ratio between the lengths of the two arms of each lever is the same as the ratio of the lengths of the sections to which they are connected.

6. In an articulated railway vehicle consisting of rigid sections of different lengths, running gears supporting the adjacent ends of the sections and each including a pair of wheels and an axle, and means for steering the axle between the sections of different lengths comprising a pair of levers of the first class fulcrumed on the running gear on the axis of the wheels at opposite sides of the middle point of said axis, each lever having arms of different lengths, a bar connecting the shorter arm of each lever to the shorter section, and a bar connecting the longer arm of each lever to the longer section.

7. In a railway vehicle, the combination with an articulated body comprising two rigid sections connected by a central pivot, a pair of wheels and an axle located near the articulation point of the sections, a resilient supporting connection between an end portion of one of the sections and the end portions of the axle formed to permit forward and backward movement of the ends of the axle with respect to the body, and means for steering the axle to keep it perpendicular to the track on curves comprising a steering linkage independent of the supporting connection and connecting the axle to the two sections at points remote from the central pivot.

8. In a railway vehicle, the combination with an articulated body consisting of rigid sections connected by vertical pivots, of a wheel axle supporting adjacent ends of two sections and means for steering the axle comprising a lever of the first class fulcrumed on the axle at one side of its middle point, and bars of lengths several times the lengths of the arms of the lever connecting the two arms of the lever to eccentric points of the two sections, the ratio between the lengths of the lever arms being the same as the ratio of the lengths of the sections to which they are connected.

9. In a railway vehicle, the combination with an articulated body consisting of two rigid sections connected by a vertical pivot, of a two-wheel running gear, means for mounting one of the sections on said running gear, a pair of levers of the first class fulcrumed on the running gear on the axis of the wheels and located on opposite sides of the middle point of the running gear, rods independent of the mounting means connecting corresponding arms of the two levers to the section mounted on the running gear to maintain the ends of these arms in fixed longitudinal position with respect to this section, and means for connecting the other arms of the two levers to the adjacent section.

10. A railway car having a body, a two-wheel running gear, means mounting the body on the running gear, a pair of levers of the first class fulcrumed on the running gear on the axis of the wheels and located on opposite sides of the middle point of the running gear, and connections independent of the mounting means between corresponding arms of the two levers and the car body to hold the ends of said arms in fixed longitudinal relation to the car body, so that said running gear may be steered by connections between the other arms of the two levers and an adjacent car.

References Cited in the file of this patent

UNITED STATES PATENTS

| 717,163 | Campbell | Dec. 30, 1902 |
| 2,030,010 | Liechty | Feb. 4, 1936 |
| 2,098,949 | Geissen | Nov. 16, 1937 |
| 2,557,354 | Kivell | June 19, 1951 |

FOREIGN PATENTS

| 154,012 | Switzerland | Apr. 15, 1932 |
| 272,808 | Great Britain | June 23, 1927 |
| 552,538 | Germany | June 15, 1932 |